United States Patent
Brown

(10) Patent No.: US 6,697,410 B1
(45) Date of Patent: Feb. 24, 2004

(54) CONTAMINANT FREE IODINE SUPPLY SYSTEM

(75) Inventor: Lloyd Chauncey Brown, San Diego, CA (US)

(73) Assignee: General Atomics, San Diego, CA (US)

(*) Notice: Subject to any disclaimer, the term of this patent is extended or adjusted under 35 U.S.C. 154(b) by 0 days.

(21) Appl. No.: 10/330,729

(22) Filed: Dec. 27, 2002

(51) Int. Cl.$^7$ ................................................ H01S 3/095
(52) U.S. Cl. ............................................ 372/89; 372/59
(58) Field of Search ........................... 372/59, 89, 92

(56) References Cited

U.S. PATENT DOCUMENTS

| | | | | |
|---|---|---|---|---|
| 4,434,492 A | * | 2/1984 | Benard et al. ................ | 372/59 |
| 4,961,200 A | * | 10/1990 | Verdier et al. ................ | 372/89 |
| 5,289,490 A | * | 2/1994 | Taniu et al. ................... | 372/92 |
| 5,693,267 A | * | 12/1997 | Beshore et al. ............... | 261/142 |
| 6,647,049 B1 | * | 11/2003 | Brown ........................ | 372/66 |

* cited by examiner

Primary Examiner—Leon Scott, Jr.
(74) Attorney, Agent, or Firm—Nydegger & Associates

(57) ABSTRACT

An on-demand system for generating Iodine gas that is substantially free of contaminants such as water, Carbon Monoxide and Carbon Dioxide includes a solid mixture of oxidizer and fuel having at least one Iodine compound. An ignitor squib is provided to ignite the mixture and thereby generate a contaminant free Iodine gas. Preferably, Iodine Pentoxide ($I_2O_5$) is used as the oxidizer and a metal such as Zinc, Tin, Calcium, Magnesium, Aluminum, Silica, Sodium, Potassium, Lithium, Boron, Beryllium, Sodium Azide or Iron is used as the fuel. With this composition, the solid mixture is substantially free of Hydrogen and Carbon compounds and the corresponding combustion gas is free of water, Carbon Monoxide and Carbon Dioxide. The mixture is disposed within a permeable jacket to capture non-gas reaction products generated during combustion such as solid and liquid metal oxides while allowing Iodine gas to pass through the permeable jacket.

22 Claims, 1 Drawing Sheet

CONTAMINANT FREE IODINE SUPPLY SYSTEM

FIELD OF THE INVENTION

The present invention pertains generally to chemical lasers that use Iodine gas as an input stream. More particularly, the present invention pertains to systems for producing contaminant free Iodine gas for use in a chemical laser. The present invention is particularly, but not exclusively, useful as an on-demand, Iodine supply system that produces an Iodine gas that is free of water, Carbon Monoxide and Carbon Dioxide contaminants.

BACKGROUND OF THE INVENTION

The Chemical-Oxygen-Iodine-Laser (COIL) is potentially useful for both military and commercial applications because it is capable of producing a high power laser beam. In the COIL process, Iodine gas is combined with singlet delta Oxygen in a laser cavity to produce a laser beam. Iodine, however, is a solid at room temperature. It must therefore be vaporized to produce the Iodine gas required in the COIL laser cavity. The All Gas Iodine Laser (AGIL) similarly requires an Iodine vapor source.

One method for producing Iodine gas involves melting Iodine in an Iodine reservoir. The Iodine vapors that are given off by the molten Iodine are then transported using a carrier gas to the laser cavity through a delivery system. In general, the required delivery system involves piping and other complex parts such as valves, precision orifices, and temperature and pressure instruments. Unfortunately, this method of producing gaseous Iodine has several drawbacks. For instance, the entire delivery system, including the carrier gas, must be preheated and maintained at elevated temperatures to prevent Iodine condensation from plugging the delivery system. For a typical COIL system that is designed for military applications, several hours are required to melt the Iodine and preheat the delivery system. On the other hand, the source for generating the singlet delta Oxygen that is to be combined with the Iodine gas requires only a fraction of a minute to reach operational status.

In the molten and gaseous states, Iodine is extremely corrosive. Because of Iodine's corrosivity, equipment exposed to Iodine, such as the Iodine reservoir and delivery system described above, must be fabricated from expensive materials such as Hastelloy C-276. In addition to degrading any exposed equipment, the corrosion reaction will, with time at temperature, contaminate the Iodine in the reservoir, requiring the Iodine in the reservoir to be periodically purified or discarded. Impurities in the Iodine must be maintained at very low levels as they may be transported to the laser cavity where they can coat the optical components. For military applications, where readiness is important, a reservoir of molten Iodine would be required at all times, leading to a significant amount of corrosion. Furthermore, the delivery system valves, which must be operated hot and in the presence of Iodine, will deteriorate with time at temperature and leak allowing corrosive Iodine to escape. Such a leak could be potentially harmful to electronic equipment. For these reasons, in order to perform routine maintenance on the molten Iodine reservoir and delivery system, these systems must be periodically shut down and allowed to cool. Additionally, maintenance of liquid Iodine systems creates a large amount of Iodine contaminated waste that requires special handling and disposal. In summary, the molten Iodine reservoir and delivery system is large, heavy, costly and complex.

The present invention recognizes that a gas containing Iodine can be generated by the combustion of a solid fuel/oxidizer mixture that contains Iodine. By using a solid source of Iodine, many of the problems associated with the use of liquid Iodine are eliminated and a supply of gaseous Iodine can be quickly produced. Examples of fuel/oxidizer systems that can be reacted to produce gaseous Iodine include the $CI_4$/Iodine Pentoxide ($I_2O_5$) system and the $CHI_3/I_2O_5$ system. Unfortunately, these fuel/oxidizer systems have the potential to produce gaseous contaminants including water, Carbon Monoxide and Carbon Dioxide. These contaminants, if present in sufficient quantities, can unacceptably degrade the performance of a COIL laser system.

In light of the above, it is an object of the present invention to provide a system for supplying Iodine gas for use in a chemical laser wherein the Iodine gas is free of water, Carbon Monoxide and Carbon Dioxide contaminants. It is another object of the present invention to provide an on-demand, contaminant free Iodine gas supply system for a chemical laser that does not require a liquid Iodine reservoir to be maintained during periods of non-demand. It is still another object of the present invention to provide an on-demand, Iodine gas stream that is free of entrained solids, water, Carbon Monoxide and Carbon Dioxide. Yet another object of the present invention is to provide an on-demand contaminant free, Iodine gas supply system which is easy to use, relatively simple to implement, and comparatively cost effective.

SUMMARY OF THE INVENTION

The present invention is directed to an on-demand system for generating Iodine gas that is substantially free of contaminants such as water, Carbon Monoxide and Carbon Dioxide. Once generated, the contaminant free Iodine gas can be used as an input stream for a chemical laser such as a Chemical-Oxygen-Iodine-Laser (COIL). More specifically, the contaminant free Iodine gas can be combined with singlet delta Oxygen in the laser cavity of the COIL to efficiently produce a high power laser beam. For the present invention, the system for generating contaminant free Iodine gas includes a solid mixture of oxidizer and fuel. An ignitor squib is provided to ignite the mixture and thereby generate a contaminant free Iodine gas.

In greater detail, the solid mixture contains at least one Iodine compound. The Iodine compound can be present in either the oxidizer, the fuel or both. Importantly, the mixture is substantially free of Hydrogen and Carbon compounds. In one embodiment of the present invention, Iodine Pentoxide ($I_2O_5$) is used as the oxidizer and a metal such as is Zinc, Tin, Calcium, Magnesium, Aluminum, Silicon, Sodium, Potassium, Lithium, Boron, Beryllium or Iron is used as the fuel. Alternatively, the fuel may be a compound, that generates additional Iodine, such as metallic Magnesium Iodide or a metallic compound that generates an inert gas, such as Sodium Azide. A preferred embodiment uses Zinc metal for the fuel and Iodine Pentoxide ($I_2O_5$) as the oxidizer. Another preferred embodiment uses Sn metal for the fuel and Iodine Pentoxide ($I_2O_5$) as the oxidizer. A third preferred embodiment uses Sodium Azide ($NaN_3$) as the fuel and Iodine Pentoxide as the oxidizer.

Upon ignition of the fuel/oxidizer mixture, the reaction products include Iodine gas with little or no water, Carbon Dioxide or Carbon Monoxide. In addition, the reaction products include metal oxides that are generally created in either the solid or liquid state. In preferred embodiments of the present invention, precautionary measures are taken to prevent the metal oxides from becoming entrained in the gaseous Iodine stream and contaminating the laser cavity. For example, in one embodiment of the present invention, the mixture is disposed within a permeable jacket. During combustion, the solid oxides are captured by the permeable jacket while the Iodine gas passes through the permeable jacket for subsequent delivery to the laser cavity. In accordance with the present invention, the permeable jacket is preferably made of a fibrous ceramic, quartz wool or fiber glass.

The permeable jacket can be used to capture both solid and liquid metal oxides. For fuel/oxidizer combinations that react to produce liquid metal oxides, a slagging agent such as Sodium Silicate, Silica, Alumina, Magnesia, Borax, Calcia or Sodium Borate can be included in the solid mixture to form a slag of the liquid metal oxides. The slagging agent may also be incorporated in the oxidizer (e.g. Magnesium Iodate). For some applications, it is preferable to form liquid metal oxides rather than solid metal oxides. For this purpose, two or more metal fuels (such as a combination of Zinc and Tin or Zinc and Silicon) may be-used in the solid mixture. By combining two or more selected metal fuels in the mixture, an oxide combination having a relatively low melting point is generated during combustion (i.e. a combination of oxides having a melting point lower than each of the individual oxides can be obtained).

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
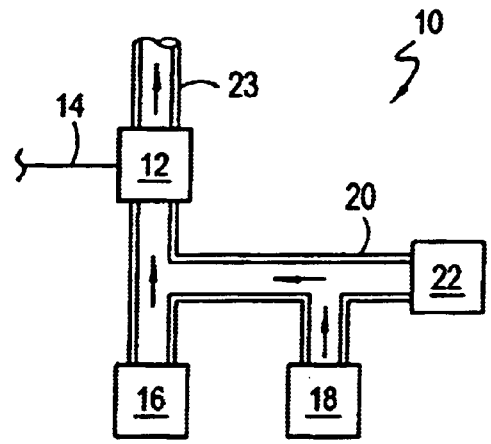
FIG. 1 is a schematic of a Chemical-Oxygen-Iodine-Laser (COIL) system in accordance with the present invention.

Referring initially to FIG. 1, a schematic of a Chemical-Oxygen-Iodine-Laser (COIL) system in accordance with the present invention is shown and generally designated 10. As shown in FIG. 1, the system 10 includes a laser cavity 12 for producing a laser beam 14. As further shown, a singlet delta Oxygen supply 16 is provided to introduce singlet delta Oxygen into the laser cavity 12. System 10 further includes an on-demand, contaminant free, Iodine supply 18 for generating a gas having Iodine as its primary constituent for use in the laser cavity 12. As shown, delivery piping 20 is provided to transport Iodine gas from the Iodine supply 18 to the laser cavity 12. An optional carrier gas supply 22, such as a Nitrogen gas generator, can be provided to promote Iodine flow through the delivery piping 20. An exhaust line 23 is provided to route exhaust gases from the laser cavity 12. If desired, these exhaust gases can be routed via line 23 to an Iodine recycle system or scrubber (not shown).

Figure 2:
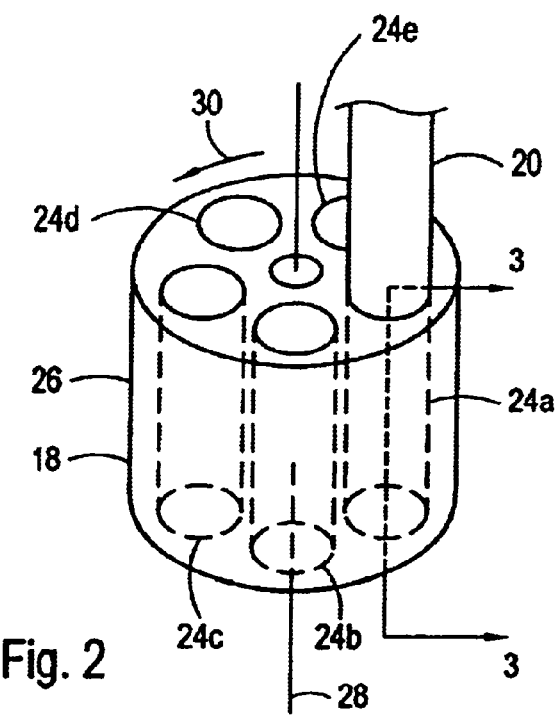
FIG. 2 is a perspective view of an Iodine gas on-demand supply system showing a plurality of Iodine supply cartridges disposed in a revolver housing to allow for the rapid exchange of Iodine supply cartridges.

Referring now to FIG. 2, a preferred embodiment of an on-demand contaminant free, Iodine supply 18 in accordance with the present invention is shown. As shown, the Iodine supply 18 includes a plurality of Iodine supply cartridges 24a–e disposed in a cylindrical revolver housing 26. In accordance with the present invention, the revolver housing 26 can be rotated about axis 28 in the direction of arrow 30 to successively align each cartridge 24a–e with the delivery piping 20 to rapidly replace each cartridge 24a–e after its use. It is contemplated that only a few seconds will lapse between successive firing of cartridges 24a–e.

Figure 3:
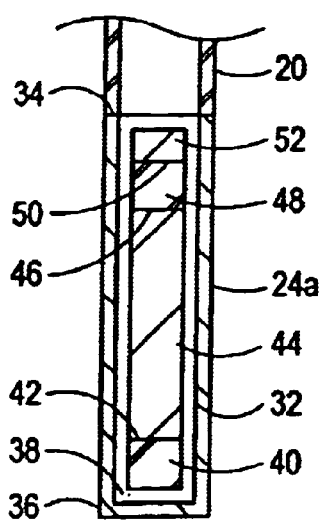
FIG. 3 is a sectional view of an Iodine supply cartridge and a portion of a delivery pipe as seen along line 3—3 in FIG. 2.

With reference now to FIG. 3, it can be seen that the cartridge 24a includes a substantially non-combustible casing 32 that is formed as a hollow cylinder. The casing 32 is formed with an open end 34 and a closed end 36. As shown, delivery piping 20 is positioned adjacent to the casing 32, and in fluid communication therewith, at the open end 34. In the preferred embodiment of the present invention, a permeable jacket 38 is disposed in the casing 32, extending from the closed end 36 to the open end 34 of the casing 32. In accordance with the present invention, the permeable jacket 38 is configured to capture solids and liquids while allowing gases to pass through the permeable jacket 38. Preferably, the permeable jacket 38 is made of a fibrous ceramic, quartz wool or fiber glass. An example of a fibrous ceramic that can be used in conjunction with the present invention is Fiberfrax® Ceramic Fiber Paper or felt that is manufactured by Unifrax Corporation.

Referring still to FIG. 3, it can be seen that a solid, Iodine-free purge material 40 is disposed in the jacket 38 extending from approximately the closed end 36 of the casing 32 to a first interface 42. For the present invention, the purge material 40 consists of an Iodine-free, solid material that produces a relatively inert gas such as Nitrogen when ignited. In a preferred embodiment of the present invention, a mixture of Sodium Azide, Potassium Nitrate and Silica is used as the purge material 40 to produce Nitrogen gas and a solid product.

The cartridge 24a also includes a solid mixture of fuel and oxidizer (mixture 44) that can be ignited to produce Iodine gas that is substantially free of contaminants such as water, Carbon Monoxide and Carbon Dioxide. In accordance with the present invention, the solid mixture 44 contains at least one Iodine compound that can be present in either the oxidizer, the fuel or both. Importantly, the mixture 44 is substantially free of both Hydrogen compounds and Carbon compounds. In one preferred embodiment of the present invention, Iodine Pentoxide ($I_2O_5$) is used as the oxidizer and a metal such as is Zinc, Tin, Calcium, Magnesium, Aluminum, Silicon, Sodium, Potassium, Lithium, Boron, Beryllium or Iron is used as the fuel. A more preferred embodiment uses Zinc metal for the fuel and Iodine Pentoxide ($I_2O_5$) as the oxidizer. Another more preferred embodiment uses Sn metal for the fuel and Iodine Pentoxide ($I_2O_5$) as the oxidizer. Another more preferred embodiment uses Sodium Azide as the fuel, Iodine Pentoxide as the oxidizer and $SiO_2$ as the slagging agent.

As shown in FIG. 3, the mixture 44 is disposed within the permeable jacket 38. Upon ignition of the mixture 44 having the above described composition, the reaction products include Iodine gas with substantially no water, Carbon Dioxide or Carbon Monoxide. In addition, the reaction products include metal oxides that are generally created in either the solid or liquid state. In accordance with the present invention, the permeable jacket 38 is configured to prevent the metal oxides from becoming entrained in the gaseous Iodine stream and contaminating the laser cavity 12 (shown in FIG. 1). More specifically, the solid and liquid metal oxides that result from combustion are captured by the permeable jacket 38. On the other hand, the Iodine gas generated during the combustion reaction passes through the permeable jacket 38 for subsequent introduction into the laser cavity 12 (shown in FIG. 1).

For mixtures 44 that react to produce liquid metal oxides, a slagging agent or mixture of slagging agents, such as Silica, Alumina, Magnesia, Calcia, Borax, Sodium Silicate, or Sodium Borate can be included in the solid mixture 44 to form a slag of the liquid metal oxides. For some applications, it is preferable to form liquid metal oxides rather than solid metal oxides. For this purpose, two or more metal fuels (such as a combination of Zinc and Tin or Zinc and Silicon) may be used in the solid mixture 44. By combining two or more selected metal fuels in the mixture, an oxide combination having a relatively low melting point is generated during combustion of the mixture 44 (i.e. a combination of oxides having a melting point that is lower than each of the individual oxides can be obtained).

In addition, a material such as Sodium Azide can be compounded in the mixture 44 with the fuel and oxidizer to generate a carrier gas such as Nitrogen (in addition to Iodine gas) when the mixture 44 is ignited. Preferably, the mixture 44 is formulated and compounded to produce a gas having Iodine as its major constituent, other than Nitrogen, when ignited. In general, for the COIL process, it is desirable to deliver Iodine to the laser cavity 12 at a temperature of approximately 160° C., diluted with Nitrogen or Helium.

Referring still to FIG. 3, it can be seen that the mixture 44 containing Iodine is disposed in the permeable jacket 38, filling the permeable jacket 38 from the first interface 42 to a second interface 46. As such, the mixture 44 is in direct contact with the purge material 40 at the first interface 42. A pelletizing method is preferably used to prepare the solid, mixture 44. More specifically, in the pelletizing method, the oxidizer and fuel are prepared in powder form and then blended together forming pellets. The pellets are then pressed in a mold (not shown), producing a solid mass having the required shape.

With continued reference to FIG. 3, it is shown that the cartridge 24a also preferably includes an Iodine-free, solid preheat material 48. As shown, the preheat material 48 is disposed in the permeable jacket 38 filling the permeable jacket 38 from the second interface 46 to a third interface 50. As such, the preheat material 48 and the mixture 44 containing Iodine are in direct contact with each other at the second interface 46. For the present invention, the preheat material 48 can be any suitable material that can be ignited to produce an elevated temperature gas. The gas, in turn, is used to preheat the delivery piping 20 to prevent Iodine condensation in the delivery piping 20 during combustion of the mixture 44. Preferably, the elevated temperature gas preheats the delivery piping 20 above the melting point of Iodine (114° C.) to prevent plugging of the delivery piping 20.

It is further shown in FIG. 3 that the cartridge 24a preferably includes an ignitor squib 52 that is disposed in the permeable jacket 38 near the open end 34 of the casing 32. As shown, the ignitor squib 52 is in direct contact with the preheat material 48 at the interface 50. With this combination of structure, the ignitor squib 52 can be activated to initiate a burn front that travels sequentially through the preheat material 48, the Iodine containing mixture 44 and the purge material 40. More specifically, the cartridge 24a is configured to uniformly pass a controlled burn front from the open end 34 of the casing 32 to the closed end 36 of the casing 32.

The operation of the COIL system 10 can best be appreciated with combined reference to FIGS. 1, 2 and 3. Initially, an unused cartridge 24a–e is aligned with the delivery piping 20. Next, when a laser beam 14 is required, the ignitor squib 52 can be activated to initiate a burn front that travels sequentially through the preheat material 48, the Iodine containing mixture 44 and the purge material 40. As the burn front passes through the preheat material 48, gases at elevated temperatures are generated that exit the cartridge 24a through the open end 34 of the casing 32 and flow through the delivery piping 20. These hot gases heat the delivery piping 20 to a temperature sufficient to prevent Iodine gas condensation in the delivery piping 20.

Once the preheat material 48 is vaporized and removed from the casing 32, the burn front passes through the Iodine containing mixture 44, igniting the mixture 44 and generating Iodine gas. The Iodine gas then exits the casing 32 through the open end 34 and flows through the preheated delivery piping 20 to the laser cavity 12. During Iodine gas generation, the carrier gas supply 22 can be activated to assist the flow of Iodine to the laser cavity 12 or alter the temperature or composition of the Iodine flow. The singlet delta Oxygen supply 16 can be activated using techniques well known in the art to deliver singlet delta Oxygen to the laser cavity 12 to react with the Iodine to produce a laser beam 14. It is to be appreciated that the flow rate of Iodine gas and the period of Iodine gas generation can be selectively altered by varying the amount and dimensions of the solid mixture 44. Furthermore, the aspect ratio of the mixture 44 in the cartridge 24a can be selected to ensure a smooth uniform burn that generates a uniform flow rate of Iodine gas for a fixed time.

Once the burn front has traversed the Iodine containing mixture 44, the burn front passes through the purge material 40, igniting the purge material 40 and generating an Iodine-free, purge gas. The purge gas then exits the casing 32 through the open end 34 and flows through the delivery piping 20 to remove any traces of corrosive Iodine from the delivery piping 20. With the first cartridge 24a depleted, the revolver housing 26 can be rotated to align another cartridge 24b–e with the delivery piping 20 to repeat the above-described process. In another application, the contaminant free Iodine supply system can be used to supply a prophylactic dose of Iodine (e.g. Potassium Iodide pills) coincident with an accidental release of radioactive Iodine from a nuclear facility.

While the Contaminant Free Iodine Supply System as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A method for generating a laser beam, said method comprising the steps of:

providing a laser cavity;

selecting a solid fuel, said fuel being substantially free of Hydrogen compounds and Carbon compounds;

selecting a solid oxidizer, said oxidizer being substantially free of Hydrogen compounds and Carbon compounds;

igniting a mixture of said fuel and said oxidizer to generate a substantially contaminant free Iodine gas and a metal oxide;

separating said Iodine gas from said metal oxide;

delivering said Iodine gas to said laser cavity; and exciting said Iodine gas to lase in said laser cavity and generate said laser beam.

2. A method as recited in claim 1 wherein said oxidizer comprises Iodine Pentoxide ($I_2O_5$).

3. A method as recited in claim 1 wherein said fuel is selected from the group consisting of a metal, a metal Iodide and a metal Azide.

4. A method as recited in claim 1 wherein said fuel comprises Sodium Azide.

5. A method as recited in claim 1 wherein said oxidizer comprises Iodine Pentoxide ($I_2O_5$) and said fuel is selected from the group consisting of Tin metal, Zinc metal and combinations thereof.

6. A method as recited in claim 1 wherein said fuel is selected from the group of fuels consisting of Zinc, Tin, Calcium, Magnesium, Aluminum, Silicon, Sodium, Potassium, Lithium, Boron, Beryllium, Iron and combinations thereof.

7. A method as recited in claim 1 further comprising the step of disposing said solid mixture within a permeable jacket for combustion therein, said permeable jacket for containing said solid oxides during separation of said solid oxides from said Iodine gas.

8. A method as recited in claim 7 wherein said permeable jacket is made of quartz wool.

9. A method as recited in claim 7 wherein said permeable jacket is made of fiber glass.

10. A method as recited in claim 7 wherein said permeable jacket is made of fibrous ceramic.

11. A method as recited in claim 1 wherein said solid mixture further comprises a slagging agent to form a slag from said metal oxides to separate said solid oxides from said Iodine gas.

12. A method as recited in claim 11 wherein said slagging agent is selected from the group consisting of Sodium Silicate, Silica, Alumina, Magnesia, Calcia and Sodium Borate.

13. An apparatus for supplying Iodine gas for use in a laser system, said apparatus comprising:

a permeable jacket;

a fuel and oxidizer mixture disposed in said permeable jacket, said fuel being substantially free of Hydrogen compounds and Carbon compounds, and comprising a material selected from the group consisting of a metal and a metallic compound, and wherein said oxidizer is substantially free of Hydrogen compounds and Carbon compounds; and means for igniting said mixture to generate Iodine gas and metal oxides, said Iodine gas for exit from said permeable jacket to separate said Iodine gas from said metal oxides.

14. An apparatus as recited in claim 13 further comprising:

a container having an open end and a closed end, said permeable jacket and said mixture disposed within said container;

a delivery pipe in fluid communication with said open end of said container;

a solid preheat material disposed in said container between said mixture and said open end of said container; and a means for igniting said preheat material to heat said delivery pipe.

15. An apparatus as recited in claim 13 further comprising:

a container having an open end and a closed end, said permeable jacket and said mixture disposed within said container;

a delivery pipe in fluid communication with said open end of said container; and a solid purge material disposed in said container between said mixture and said closed end of said container, said purge material for ignition by said mixture to generate a purge gas for exit from said open end of said container and transit through said delivery pipe to flush gaseous Iodine from said delivery pipe.

16. An apparatus as recited in claim 14 further comprising a solid purge material disposed in said container between said mixture and said closed end of said container, said purge material for ignition by said mixture to generate a purge gas for exit from said open end of said container and transit through said delivery pipe to flush gaseous Iodine from said delivery pipe.

17. A laser system comprising:

a laser cavity;

a solid mixture of fuel and oxidizer, said mixture comprising Iodine, said fuel being substantially free of Hydrogen compounds and Carbon compounds and said oxidizer being substantially free of Hydrogen compounds and Carbon compounds;

a means for igniting said mixture to generate a substantially contaminant free Iodine gas and a metal oxide;

a means for separating said Iodine gas from said metal oxide;

a means for delivering said Iodine gas to said laser cavity; and a means for using said Iodine gas in said laser cavity to generate a laser beam.

18. A laser system as recited in claim 17 wherein said means for exciting said Iodine gas comprises a source of singlet delta Oxygen.

19. A laser system as recited in claim 17 wherein said solid mixture is disposed in a first container and further comprising a second container having a fuel and oxidizer mixture disposed therein; and a means for exchanging said second container in place of said first container to allow said mixture in said second container to be ignited to create additional said Iodine gas for introduction into said laser cavity.

20. A laser system as recited in claim 19 wherein said exchanging means is a revolver.

21. A laser system as recited in claim 17 wherein said oxidizer comprises Iodine Pentoxide ($I_2O_5$).

22. A laser system as recited in claim 17 wherein said fuel is selected from the group of fuels consisting of Zinc, Tin, Calcium, Magnesium, Aluminum, Silica, Sodium, Potassium, Lithium, Boron, Beryllium, Iron, Sodium Azide and combinations thereof.

* * * * *